Jan. 8, 1952        W. J. SECREST        2,581,937
BIAS CUTTER CONTROL MECHANISM
Filed Sept. 22, 1949        3 Sheets-Sheet 1
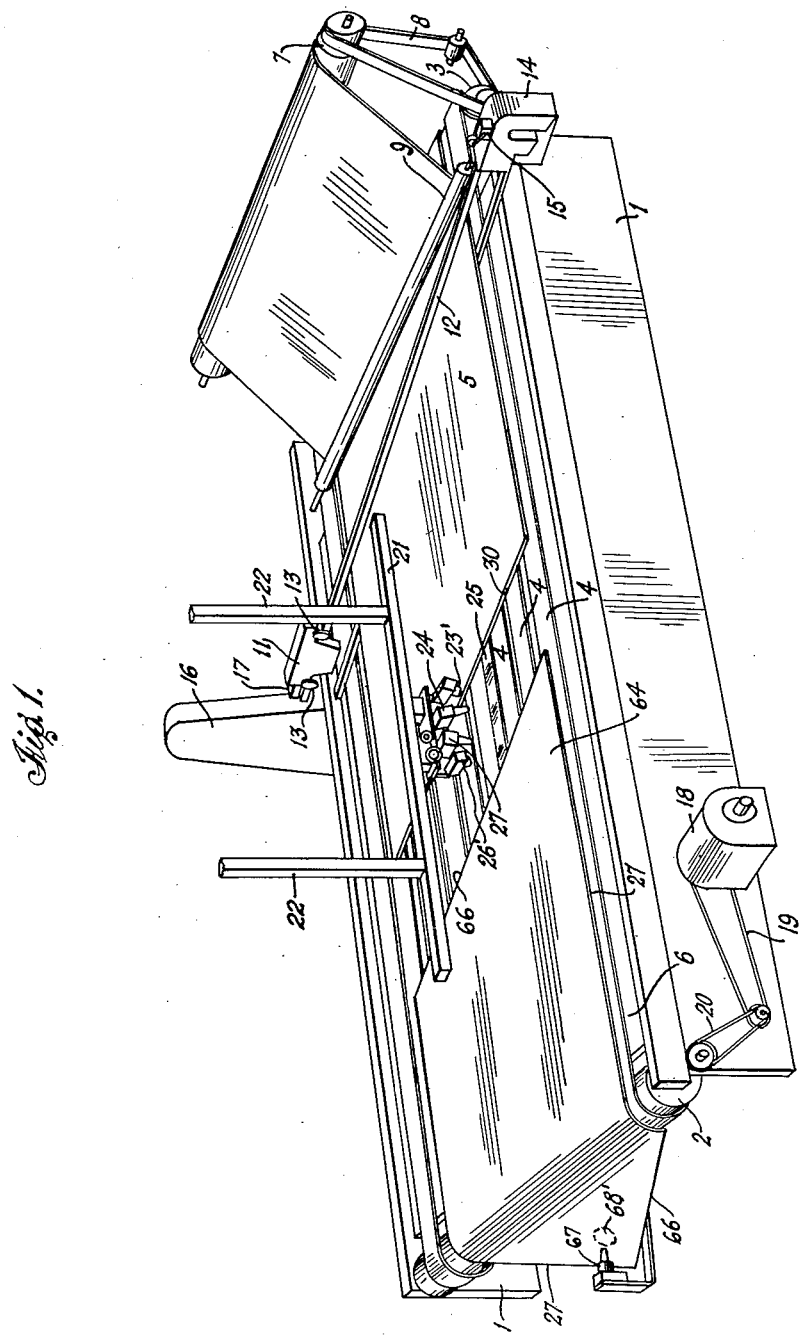
Inventor
WILLIAM J. SECREST
By Ely & Frye
Attorneys

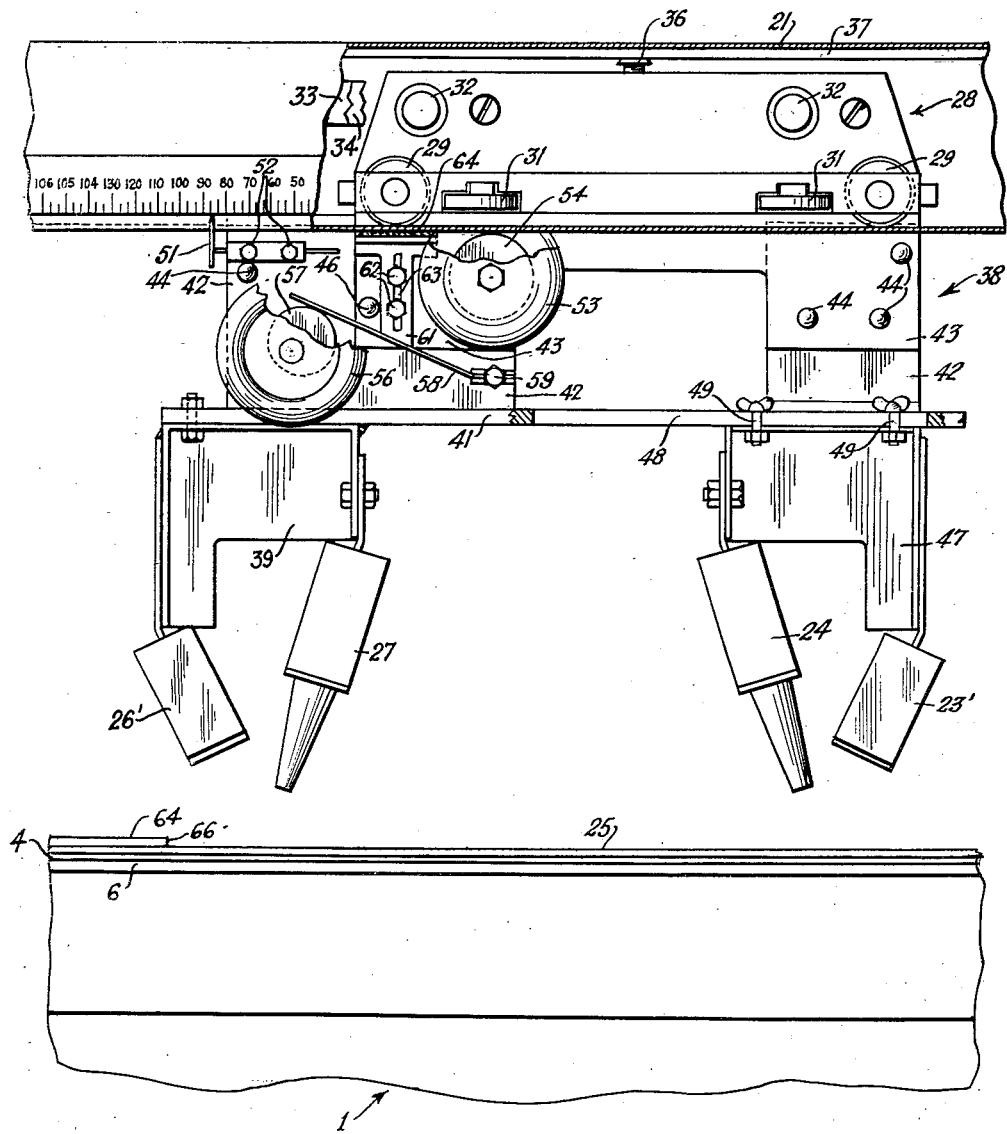

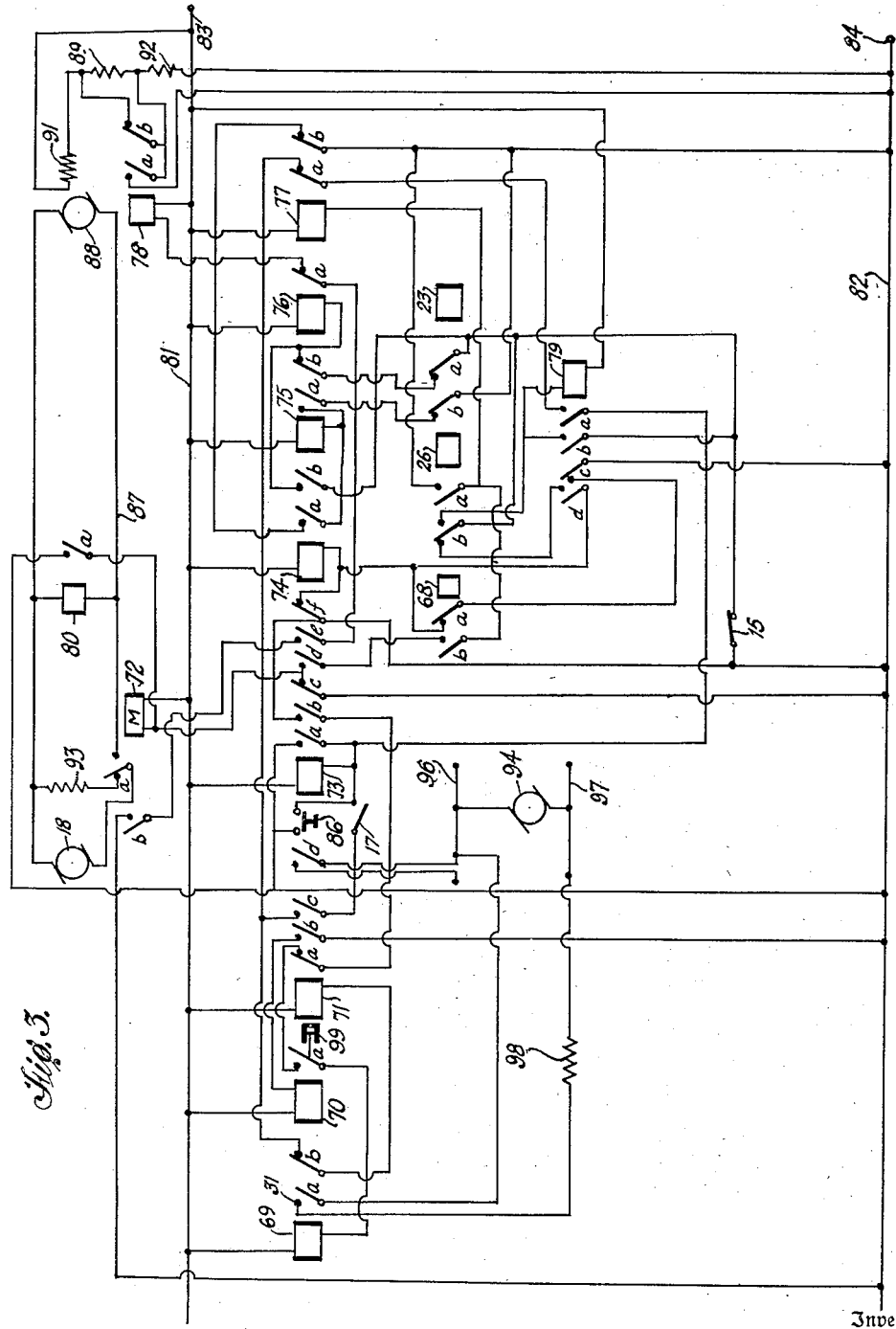

UNITED STATES PATENT OFFICE 2,581,937

BIAS CUTTER CONTROL MECHANISM

William J. Secrest, Cuyahoga Falls, Ohio, assignor to The Firestone Tire & Rubber Company, Akron, Ohio, a corporation of Ohio Application September 22, 1949, Serial No. 117,189

14 Claims. (Cl. 164—48)

This invention relates to speed control for conveyors and the like, and in particular to a control for a system involving slow-down followed by full stop.

In the processing of materials on conveyors wherein conveyor stoppage is related to precise positioning of the material as where an exact length is to be cut, motor coasting and the uncertainties of highly accelerated solenoid braking are objectionable features. This problem is particularly aggravated by the fact that production demands require as high an operating speed as possible for the conveyor.

Considering, for example, the cutting of cord fabric on a bias cutter for tire building, in some installations, the cut sections can be forwarded for further processing as fast as the conveyor can deliver. Heretofore, these bias cutters have been equipped with a main A. C. drive motor equipped with a solenoid brake for quick stopping, the width of cut being governed by a limit switch. Since the conveyor accelerated and decelerated very rapidly (which is typical of A. C. drive and solenoid brake) considerable error of positioning resulted on stopping of the belt. It was, therefore, necessary to have a hand wheel mounted on the side of the cutter so that, with the aid of a pointer, the operator could adjust the conveyor forward or backward in order to get the correct width before the cross-travel knife commenced its cut. This required an alertness on the part of the operator which is difficult of realization for prolonged periods and, as a result, widths of cut material have been erratic. Maintenance also was found to be quite high as a result of the rapid acceleration and deceleration of the mechanical equipment.

According to the present invention, the foregoing difficulties are overcome by the use of photoelectric cells operating in conjunction with preliminary slow-down of a D. C. motor, followed by positive stoppage. As a feature of the invention the ply travel on the conveyor is arranged so that the cut sections travel slightly faster than the following sheet, so that a gap is available for photocell actuation. This is done by running the conveyor at a greater linear speed than that of the rolls which feed the sheet material to the conveyor.

In the sequence of events in the cutting cycle, the leading edge of the advancing sheet, prior to cutting, interrupts an energizing light beam to one photocell and such de-energization functions to slow down the conveyor motor to condition it for quick stoppage. Following this, the leading edge of the now slowly advancing sheet interrupts the energizing beam to a second photocell, resulting in stoppage of the conveyor motor and starting of an auxiliary motor effecting, by a cyclic, driving connection, transverse movement and return of a cross-travel knife, which knife cuts the sheet on the bias, operates a switch on its outward excursion for resumption of travel of the conveyor, and operates a switch on completion of its return travel to stop said auxiliary motor, following which the slow-down and stoppage of the conveyor motor is, in the ordinary case, automatically repeated. However, a third photocell may be employed to temporarily maintain stoppage of the conveyor motor between cuts pending manual removal of the cut sheet, in the case where, for any reason, the ply sections cannot be spliced as fast as the bias cuts are made. In this case, the motor stoppage is maintained by interruption of a light beam to the third photocell by the cut section of the sheet, conveyor travel being automatically resumed when the cut sheet is removed. The gap between the cut and uncut portions of the sheet, mentioned above, serves to re-energize the first and second photocells so as to set up the various circuits involved in the cycle of operations, for continued, automatic action.

It is, therefore, an object of the invention to increase the accuracy of stop-positioning of a motor-driven element. A further object is to accomplish accurate stoppage of a moving conveyor by preliminary slow-down. More particularly, it is an object to stop a conveyor in stages in response to the action of photoelectric cells, another and related object being to provide for differential speed of travel of objects on a conveyor to space the same for photocell actuation.

These and other ends, which will be apparent to those skilled in the art, are attained by the invention, certain embodiments of which are described in the accompanying specification and illustrated in the drawings, in which:

Fig. 1 is a view in perspective of a bias cutter machine for tire cord fabric,

Fig. 2 is an enlarged side elevation, partially broken away, of the suspension for the main photocells and their light sources, and Fig. 3 is a wiring diagram showing the controls for the apparatus of Fig. 1.

Referring to the drawings by characters of reference, there is shown in Fig. 1 a bias cutting machine of standard construction, having a pair of upright support plates 1 at the ends of which are journaled, near the upper portion, a pair of rollers 2, 3, over which are trained a series of conveyor belts 4 which serve to carry the fabric sheet 5. The belts 4 are suitably supported between rollers 2, 3 as by a plate member 6 supported between uprights 1.

The sheet 5, before contacting the conveyor belts, passes over a roll 7 which is driven from the conveyor as by a belt 8 so as to have a peripheral speed less than the linear speed of the conveyor belts 4. After passing over roll 7, the sheet passes under a roll 9 which increases the traction of the sheet on roll 7 and ensures smoothness in the sheet for proper cutting, and helps retard the sheet on the conveyor to provide the gap between the cut and uncut portions of the sheet.

The cut is made at an angle to the belts 4 by a knife of any suitable type, either straight or in the form of a rotatable disc, carried on a carriage 11, having rollers 13, which traverses the sheet (by means not shown) on a cross bar 12, the bar 12 being supported at one end by a member 14 on which is mounted a limit switch 15 and, on the other end, by an upright 16. A limit switch 17 is mounted on bar 12 at the end adjacent upright 16. The limit switches 15 and 17 are contacted by feelers or the like on opposite ends of the carriage 11. The bar 12 is set at an oblique angle with respect to the conveyor to impart the requisite bias angle to the strips of bias cut fabric. The angle at which the bias is set may be varied.

The conveyor is driven by a motor 18 and chain drives 19, 20.

The slow-down and stop photocells are carried above the conveyor on a trolley, movable in a conventional trolley duct 21, which is suspended from any suitable structure above the machine by rods 22. Photocell 23', which is adapted to bring about slowing of the motor 18, when de-energized, is inclined so as to be energized by light from a source 24, also inclined, after reflection from a polished metal strip 25 carried on the belt-supporting plate 6. In the same manner, photocell 26', which serves to bring about stoppage of the motor when de-energized, is inclined to receive light from an inclined light source 27, which is reflected into the photocell 26 from the strip 25.

The manner of mounting the photocells 23', 26' and their light sources is shown in enlarged detail in Fig. 2. A trolley, indicated generally by the numeral 28, is of conventional form, in that it is movable in trolley duct 21 by means of rollers 29 and lateral, spacing rollers 31, has brushes 32 contacting bus bar 33, like brushes contacting a bus bar 34 on the opposite side of the duct, a brush 36 contacting a bus bar 37 at the top of the duct, and has a depending portion 38 which passes through a central, longitudinal slot in the bottom of the duct, and which serves for attachment of power equipment or the like which is to be used at various positions along the duct.

Photocell 26' and its light source 27 are attached to a bracket 39 which is fixed in place on a plate 41 having uprights 42, 43 bolted, respectively, as at 44, 46 to the dependent portion 38 of the trolley. Photocell 23' and its light source 24 are also mounted on a bracket 47 carried by plate 41 but the bracket is adjustable to and from bracket 39 by means of a slot 48 in the plate 41 through which the holding bolts 49 pass. For quick adjustment, the latter are provided with wing nuts.

For exact positioning of the trolley, an index 51 is attached to the upright 43 by bolts 52, and a scale is provided on the side face of the trolley duct 21. The trolley may be shifted along the duct manually, but for final positioning, a hand wheel 53 is provided, which carries a friction wheel 54 engageable with the underside of the duct. For locking the trolley, a second hand wheel 56 carries an eccentrically mounted disk 57 engaging a lever 58 pivoted at 59, which lever engages a cam 61 slidable along bolts 62 by means of a slot 63 and having a layer 64 of suitable friction material engageable with the under side of duct 21.

The sheet 5 has cords running longitudinally therethrough. In the formation of tire ply sheeting, the cut sections 64 are turned and reunited along what were the marginal edges of the sheet 5, so that the cut edges 66 become the marginal edges of the newly formed sheet, and the cords in this new sheet are disposed at an angle to the longitudinal extent of the sheet. In certain installations, where only one operation of re-forming the sheet is being served from a single bias cutter, there will necessarily be a delay in removal of the cut pieces. In such cases it will be necessary to interrupt operation of the bias cutter. This is the situation shown in Fig. 1, the motor 18 being stopped and a cut section 64 of fabric lying on and overhanging the end of the conveyor.

In Fig. 1, the section 64, in dropping from roller 2, has interrupted light from a source 67 to a photocell 68' to stop the motor 18, thus interrupting sheet 5 in its progress toward slow-down photocell 23'. Obviously, photocell 68' may have any location convenient for the purpose.

Cut sections 64 are removed manually as needed and this action re-exposes photocell 68' and starts the conveyor motor 18. As the leading edge of sheet 5 meets the light beam to photocell 23', the motor speed is slowed. In the short interval between the interruption of photocell 23' and the interruption of photocell 26', the motor speed is rapidly reduced to such a low value that complete stoppage is effected with great suddenness and precision upon merely partial penetration of the pencil of light from source 27 by the leading edge of the sheet.

The control circuits for automatic slow-down, stop and start are shown in Fig. 3. The system comprises relays numbered from 69 to 80, inclusive, and three relays 23, 26 and 68 which are energized through the three photocells 23', 26' and 68'. For the sake of simplicity, and since any conventional set-up may be employed, the photocells and related circuits for energizing the associated relays have been omitted in Fig. 3. The switches associated with the relays are designated by letters and any one is defined by its letter together with the reference character of its relay. Voltage for the controls is supplied by conduits 81, 82, having suitable terminals 83, 84 for connection to a source of power.

With the conveyor stopped, and no material covering photocells 23', 26' or 68', the latter are energized. Likewise energized are relay 74 (through 73f); relay 79 (through 26b); relay 76 (through 74b); and relay 77 (through 26a).

Conveyor start

As the button 86 is pressed to start the conveyor, relay 73 is energized and seals in through 73a. Relay 74 is de-energized at 73f. Relay 76 is de-energized at 74b. Relay 72 is energized through 73d, 68b and 26a, and switch 72a connects conveyor motor 18 to the lead 87 from a generator 88 to start the motor. At the same time, relay 78 is energized through 76a, 73e and 72b; 78b opens to throw the running resistance 89 into the circuit of generator field coil 91, and 78a closes to short out the slow-down resistance 92 of the generator field coil, whereupon full voltage is supplied to motor 18 and the conveyor runs at full speed.

At this stage the energized relays are as follows:
The photocell relays 23, 26 and 68, and
Relays 73, 79, 77, 78 and 72

Conveyor slowdown

The moving sheet on the conveyor breaks the light beam to photocell 23', energizing relay 76 through 75b and 23e. Relay 78 is de-energized by the opening of 76a, running resistance 89 is by-passed by 78b, and slow-down resistance 92 is cut in by the opening 78a. Closing of 23b sets up a circuit to 75a so that relay 75 will seal in when energized.

The energized relays are then:
Photocell relays 26 and 68, and
Relays 73, 79, 76, 77 and 72

Conveyor motor stop and braking

With the light beam at photocell 23' still broken, the sheet material continues on to interrupt the beam at photocell 26', and 26a opens, de-energizing relay 72. Switch 72a, which in the energized condition of relay 72 closes line 87 from the generator 88 to conveyor motor 18, now shifts to stop the motor and places a resistance 93 across the motor as a brake. The de-energization of photocell relay 26 drops out relay 77 through switch 26a.

Cross travel of knife

As a result of the dropping of relay 77, relay 71 is energized through 69b, 77a, 79a and 73a. Switch 71d thereupon closes a circuit to a motor 94, shown as having suitable leads 96, 97 for attachment to a source of voltage, and which is adapted to move knife carriage 11 across the conveyor and back. The motor 94 is shown with the most simplified form of control elements inasmuch as it forms no part of the present invention beyond the manner in which its starting and stopping fits into the sequence of the slowdown, stop and re-start of the conveyor motor.

With the de-energizing of photocell relay 26, dropping of relay 77 and stopping of the conveyor, relay 74 is energized through 79d and 26b; relay 76 is energized through 74b in addition to its energization through 75b and 23a; relay 75 is energized through 74a and 77b and seals in through 75a and 23b; relay 70 is energized through 71b; and a circuit to relay 69 is set up at 70a but is, at this time, open at 71a.

As soon as the carriage 11 starts to move it permits closing of limit switch 17 which seals in relay 71 through 71c and 73a to maintain operation of the cross-travel knife carriage.

At this stage the energized relays are as follows:
Photocell relay 68, and
Relays 73, 74, 79, 76, 75, 70 and 71

Return of cross-travel knife and re-start of conveyor motor

At the end of the cutting stroke of knife 10, limit switch 15 is momentarily operated, dropping relays 74, 79 and 76. Relay 77 is energized through 79c and relay 72 is energized through 73d, 68b and 79c. Relay 78 is energized through 76a, 73e and 72b to short out the "slow-down" resistance 92 through 78a and throw in the running resistance 89 by opening of 78b. The conveyor motor is started by closing of line 87 by switch 72a, resistance 93 being cut out at the same time, and the cut sheet advances, followed by the main sheet with the distance between them increasing.

Energized relays at this stage are as follows:
Photocell relay 68, and
Relays 73, 75, 77, 78, 71, 72 and 70

Stoppage and braking of cross-travel knife motor

As is well known in the art, the bias-cutting knife has a cyclic, driven connection with its motor whereby it crosses the conveyor and returns without necessity for reversing the motor. Preferably it cuts on the outward stroke. At start of cross-travel return of carriage 11, limit switch 15 recloses. Near the end of cross-travel return, limit switch 17 opens, dropping out relay 71. Relay 69 is energized through 70a, 71a and 73b, and a resistance 98 is put across motor 94 by switch 69a to brake the motor to a stop. Relay 70 is de-energized by opening of 71b. The opening of switch 70a is delayed by appropriate means such as a dashpot 99. When 70a opens, relay 69 is de-energized, cutting out the braking resistance 98 at switch 69a.

At this stage photocell relay 68 is still energized and relays 73, 75, 77, 78 and 72 are energized.

Interruption of conveyor travel

Before the gap following the cut portion arrives under the light beam from source 24, the cut sheet interrupts the light to photocell 68'. This opens the energizing circuit of relay 72 at 68b but relay 71 holds in through switch 80a of a voltage relay 80 energized in the circuit of generator 88. Relay 74 is energized through 68a and 79c. Switch 74b closes a parallel circuit to relay 76. Relay 78 is dropped at 76a for "slow-down" of conveyor motor. When the voltage drops to a safe value switch 80a opens, dropping relay 72 and stopping the conveyor.

At this stage the gap following the cut sheet has not reached photocell 23' and therefore the cross-travel knife has not operated.

Assuming that, at this stage, the cut sheet is also interrupting the light at both photocells 23' and 26', the energized relays are as follows: 73, 74, 76 and 77.

Resumption of conveyor travel

Upon removal of the cut sheet, all three photocells are energized. Relay 75 is dropped by the opening of 23b and switch 75b closes, setting up a circuit to relay 76, the circuit being open at 23a. Photocell relay 26 being energized, relay 79 is energized through 26b and seals in through 79b. At this stage, conditions are the same as in the early part of the foregoing description with the edge of the uncut sheet advancing to interrupt the beam at photocell 23'. There follows: Conveyor motor slow-down and stop, cross travel and return of the knife, resumption of conveyor travel, with the cut sheet advancing faster than the uncut sheet to provide a gap, and interruption of the conveyor when the light beam at photocell 68' is cut off.

If photocell 68' is omitted, the system will operate continuously but the re-energization of relay 43 is necessary for automatic cyclic action and, in the example shown, this is accomplished by providing for the gap between the sheets, but other means could be employed to accomplish this result.

Resume

Briefly recapitulating the cycle of operations, the conveyor in motion carries the sheet to be cut. The conveyor is slowed when the leading edge of the sheet interrupts the light to photocell 23', and the conveyor is completely stopped when the leading edge of the sheet interrupts the light to photocell 26'. The cross-travel of the knife commences, being sealed in by switch 17. At the end of the outward excursion of the knife, during which the cut is made, switch 15 starts the conveyor. The knife returns and its travel motor is stopped by switch 17. The cross-travel motor is then braked by action of relay 69. The gap appears between the cut sheet and the following sheet, and photocells 23' and 26' are energized to set up the circuits for a repeat cycle, and finally the cut sheet interrupts the light to photocell 68' to stop the conveyor. Upon manual removal of the cut sheet, the conveyor resumes motion and the cycle is repeated. The re-energization of photocells 23' and 26', by the gap between the sheets, may take place before de-energization of photocell 68' or after removal of the cut sheet and resumption of conveyor travel.

In order to clearly illustrate the novel features, many conventional control elements have been omitted from the wiring diagram. These being conventional, their character and location will be readily apparent to those skilled in the art.

Although in the machine described the speed of travel of the uncut sheet is reduced relatively to that of the cut portions to provide the gap, the same effect could be achieved by an increase of speed of the cut portions over that of the uncut sheet.

While particular embodiments have been shown, these are for purposes of illustration and it will be understood that various modifications may be resorted to without departing from the spirit or scope of the appended claims.

What is claimed is:

1. In a machine as in claim 14, a third photoelectric cell and light source spaced from the first mentioned cells in the direction of advance of the cut material and adapted to stop the motor on interruption of the light from its source.

2. In a machine having a cutter for severing material advancing on a conveyor, a conveyor motor, a pair of photoelectric cells arranged in spaced relation along the conveyor and de-energizable by passage of said material, means responsive to de-energization of the first cell to slow the motor, means responsive to de-energization of the second cell to stop the motor, means responsive to stoppage of the motor to effect severance of the material, means responsive to severance of the material to start the motor independently of the said cells, and means to effect a differential rate of advance between the cut and uncut portions of said material whereby a gap is produced for restoration of control of said motor by said cells.

3. In a machine having a cutter for severing material advancing on a motor-driven conveyor, means to position the material for severing, comprising means to automatically provide a gap between a cut portion of material and the following uncut sheet while both are advancing, means responsive to advance of the leading edge of the uncut sheet to reduce the speed of the conveyor motor, and means responsive to further advance of said leading edge to stop the conveyor motor, said responsive means being actuable through said gap.

4. In a machine having a cutter for severing material advancing on a motor-driven conveyor, means to position the material for severing comprising means to automatically provide a gap between a cut portion of material and the following uncut sheet while both are advancing, a pair of light responsive means actuable through said gap, one of which is de-energized by passage of the leading edge of the uncut sheet for reducing the speed of the conveyor motor and the other of which is de-energized by passage of said leading edge to stop the conveyor motor.

5. In a machine having a cutter for severing material advancing on a motor-driven conveyor, means responsive to passage of the leading edge of the uncut sheet to reduce the speed of the conveyor motor, means responsive to further passage of said leading edge to stop the motor, and means to retard the speed of advancement of the uncut sheet relative to that of the cut portion of the sheet, while both are advancing, to automatically provide a gap therebetween, said responsive means being actuable through said gap.

6. In a machine for severing material advancing on a motor-driven conveyor, means responsive to passage of the leading edge of the uncut sheet to reduce the speed of the conveyor motor, means responsive to further passage of said leading edge to stop the motor, means responsive to stoppage of the motor to actuate a severing mechanism, and means responsive to completion of the severing operation to start the conveyor motor, said conveyor including means to move the cut portions of material at a relatively faster rate than the following uncut material, to automatically provide a gap therebetween, said responsive means being actuable through said gap.

7. In a machine for severing material advancing on a motor-driven conveyor, a plurality of light-responsive means located for light interruption by the passing material, said means adapted to control slow-down and stoppage of the conveyor motor, and means providing a differential speed between cut portions of material and the following uncut material whereby the cut portions advance at the faster rate, to automatically provide a gap therebetween, said responsive means being actuable through said gap.

8. In a machine for severing material advancing on a conveyor, a variable voltage D. C. motor system for driving the conveyor, means responsive to passage of the leading edge of the uncut sheet to lower the voltage on the motor, means responsive to further advance of the said leading edge to stop the motor, and means providing a differential speed between cut portions of the material and the following uncut material whereby the cut portions advance at the faster rate, to automatically provide a gap therebetween, said responsive means being actuable through said gap.

9. In a machine for severing material advancing on a conveyor, a variable voltage D. C. motor system for driving the conveyor, means responsive to passage of the leading edge of the uncut sheet to lower the voltage on the motor, means responsive to further advance of the said leading edge to simultaneously stop and brake the motor, and means providing a differential speed between cut portions of the material and the following uncut material whereby the cut portions advance at the faster rate, to automatically provide a gap therebetween, said responsive means being actuable through said gap.

10. In a machine for severing material advancing on a conveyor, a D. C. motor to drive the conveyor, a driven generator to supply voltage to the motor, means responsive to passage of the leading edge of the uncut sheet to reduce the voltage at the motor, means responsive to further passage of said leading edge to stop the motor, and means providing a differential speed between cut portions of the material and the following uncut material whereby the cut portions advance at the faster rate, to automatically provide a gap therebetween, said responsive means being actuable through said gap.

11. In a machine for severing material advancing on a conveyor, a D. C. motor to drive the conveyor, a driven generator to supply voltage to the motor, means responsive to passage of the leading edge of the uncut material to reduce the voltage at the motor, means responsive to further passage of said leading edge to both stop the motor and apply braking thereto, and means providing a differential speed between cut portions of the material and the following uncut material whereby the cut portions advance at the faster rate, to automatically provide a gap therebetween, said responsive means being actuable through said gap.

12. In a machine for severing material advancing on a conveyor, a D. C. motor to drive the conveyor, a driven generator to supply voltage to the motor, means providing a differential speed between the cut and uncut portions of material on the conveyor whereby the cut portions advance at the faster rate, to automatically provide a gap between said portions, means responsive to passage of the thus exposed leading edge of the uncut material to lower the voltage supplied to the motor, and means responsive to further passage of said leading edge to stop the motor, said responsive means being actuable through said gap.

13. In a machine for severing material advancing along a conveyor, a D. C. motor to drive the conveyor, a driven generator to supply voltage to the motor, means providing a differential speed between the cut and uncut portions of material on the conveyor whereby the cut portions advance at the faster rate, to automatically provide a gap between said portions, light-responsive means actuated by passage of the leading edge of the uncut sheet and adapted to lower the voltage on the motor, and light-responsive means actuated by further passage of the uncut sheet and adapted to stop the motor, said responsive means being actuable through said gap.

14. In a machine for severing material, a conveyor, a motor to drive the conveyor, a pair of photoelectric cells each having a light source, arranged in spaced relation along the conveyor, one adapted to lower the speed of the motor and the other adapted to stop the motor, light-reflecting means on the conveyor under the said light sources and cells and beneath the line of travel of said material whereby the beams from said light sources are interrupted on passage of said material, and means to provide a differential speed between the cut and uncut portions of said material whereby the cut portions advance at the faster rate and automatically produce a gap for energization of said cells.

WILLIAM J. SECREST.

REFERENCES CITED

The following references are of record in the file of this patent:

UNITED STATES PATENTS

| Number | Name | Date |
| --- | --- | --- |
| 2,003,027 | Wright | May 28, 1935 |
| 2,261,837 | Allen | Nov. 4, 1941 |
| 2,360,275 | Rau | Oct. 10, 1944 |
| 2,458,612 | Luzzatto | Jan. 11, 1949 |